(12) United States Patent
Chung et al.

(10) Patent No.: US 9,035,915 B2
(45) Date of Patent: May 19, 2015

(54) PHOTO SENSOR TYPE TOUCH PANEL (71) Applicant: AU Optronics Corp., Hsin-Chu (TW)

(72) Inventors: Yueh-Hung Chung, Hsin-Chu (TW); Yi-Ru Cheng, Hsin-Chu (TW); Ya-Ling Hsu, Hsin-Chu (TW); Hsueh-Ying Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 295 days.

(21) Appl. No.: 13/749,657

(22) Filed: Jan. 24, 2013

(65) Prior Publication Data

US 2014/0015801 A1    Jan. 16, 2014

(30) Foreign Application Priority Data

Jul. 13, 2012 (TW) .............................. 101125370 A (51) Int. Cl.
*G06F 3/042* (2006.01)
*G06F 3/041* (2006.01)

(52) U.S. Cl.
CPC .............. *G06F 3/042* (2013.01); *G06F 3/0412* (2013.01)

(58) Field of Classification Search
USPC .................................................. 345/156–175
See application file for complete search history.

(56) References Cited

U.S. PATENT DOCUMENTS

| 7,009,663 | B2 * | 3/2006 | Abileah et al. ................... 349/12 |
| 8,081,147 | B2 | 12/2011 | Lee et al. |
| 2002/0030768 | A1 * | 3/2002 | Wu ................................. 349/42 |
| 2005/0116937 | A1 * | 6/2005 | Choi et al. ..................... 345/173 |
| 2009/0135333 | A1 * | 5/2009 | Tai et al. ........................ 349/61 |
| 2009/0295692 | A1 * | 12/2009 | Lee et al. ........................ 345/87 |
| 2010/0097354 | A1 * | 4/2010 | Ahn et al. ...................... 345/175 |
| 2010/0156819 | A1 | 6/2010 | Takahashi et al. |
| 2011/0315991 | A1 * | 12/2011 | Sugihara et al. ................. 257/59 |
| 2012/0113055 | A1 * | 5/2012 | Liu et al. ........................ 345/175 |
| 2012/0236223 | A1 * | 9/2012 | Chen et al. ....................... 349/42 |
| 2012/0249943 | A1 * | 10/2012 | Pai .................................. 349/141 |
| 2012/0293460 | A1 * | 11/2012 | Liu ................................. 345/175 |

FOREIGN PATENT DOCUMENTS

TW          200643518      12/2006

\* cited by examiner

*Primary Examiner* — Grant Sitta
(74) *Attorney, Agent, or Firm* — Winston Hsu; Scott Margo (57) ABSTRACT

A photo sensor type touch panel includes a plurality of readout lines electrically connected in parallel. The overall capacitance of a coupling capacitor between the readout lines connected in parallel and adjacent data lines having one type of polarity is equal to the overall capacitance of a coupling capacitor between the readout lines connected in parallel and adjacent data lines having the other type of polarity.

14 Claims, 12 Drawing Sheets

PHOTO SENSOR TYPE TOUCH PANEL

BACKGROUND OF THE INVENTION

1. Field of the Invention

The present invention relates to a photo sensor type touch panel, and more particularly, to a photo sensor type touch panel including a plurality of readout lines electrical connected in parallel and having equal coupling capacitors between the readout lines and adjacent data lines of different polarity types.

2. Description of the Prior Art

The touch panel has been prevalently used in the input interfaces of the instruments for its properties such as the diversification for design and the interaction between machines and humans. According to the different input mechanism, the touch panel can be classified to resistive type, capacitive type, electromagnetic type, and optical type. The optical type touch panel can be further divided into optical imaging type and photo sensor type. On the other hand, according to different integration designs for the touch panel and the display panel, the touch panel can be classified to out-cell type and in-cell type touch panel. Among aforementioned touch techniques, the photo sensor type touch panel has possessed the greatest market potential due to its advantages of multi-touch function and convenience to be integrated into display panel fabrication.

The photo sensor type touch panel includes photo sensing devices for detecting illumination intensity and for generating touch signals, and readout lines for reading the touch signals. The photo sensing devices and the readout lines are fabricated on the array substrate of the display panel, together with the thin film transistors (TFTs) and the pixel electrodes. The readout line is disposed in between two adjacent data lines and thus a coupling capacitor is respectively formed between the readout line and the two adjacent data line. Consequently, the data signals from the data lines and the touch signals from the readout lines suffer variations due to the impact from the coupling capacitor. Furthermore, since the capacitance of the two coupling capacitors are not equal, the capacitance of the coupling capacitor between the readout line and the adjacent data lines at frame time N is not equal to the capacitance of the coupling capacitor between the readout line and the adjacent data lines at frame time N+1 when the data lines of the display panel adopt column inversion driving approach, particularly when high gray level images are displayed. In other words, because of the influence from the coupling capacitor, the signal read out by the readout lines may be recognized positive at one frame time (such as frame time N) while another signals read out by the readout lines may be recognized negative at another frame time (such as frame time N+1). Therefore, the track of touch points suffers non-continuance issue, that is the broken line issue, during user's manipulations. Accordingly, the touch panel is blamed for inferior detection accuracy.

SUMMARY OF THE INVENTION

One of the objectives of the present disclosure is to provide a photo sensor type touch panel of superior detection accuracy.

To achieve the purposes described above, an embodiment of the present disclosure provides a photo sensor type touch panel. The photo sensor type touch panel includes a plurality of gate lines, a plurality of data lines, a plurality of readout lines, and a plurality of photo sensing devices. The gate lines include a plurality of first gate lines and a plurality of second gate lines, wherein the first gate lines and the second gate lines are alternately disposed. The data lines intersect the gate lines, and the data lines include a plurality of first data lines and a plurality of second data lines. Data signals of the first data lines have a first polarity, data signals of the second data lines have a second polarity, and the first polarity and the second polarity are opposite to each other. The readout lines include a first readout line disposed in between two adjacent first data line and second data line, and a second readout line disposed in between another two adjacent first data line and second data line. The first readout line and the second readout line are electrically connected in parallel. The first readout line and the first data line adjacent to the first readout line have a first coupling capacitor, the first readout line and the second data line adjacent to the first readout line have a second coupling capacitor, the second readout line and the first data line adjacent to the second readout line have a third coupling capacitor, and the second readout line and the second data line adjacent to the second readout line have a fourth coupling capacitor. An overall capacitance of the first coupling capacitor and the third coupling capacitor is substantially equal to an overall capacitance of the second coupling capacitor and the fourth coupling capacitor.

The photo sensor type touch panel provided by the present disclosure includes the plurality of readout lines electrically connected in parallel, and the overall capacitance of the coupling capacitor between the readout lines and its adjacent data lines having one type of polarity is substantially equal to the overall capacitance of the coupling capacitor between the readout lines and its adjacent data lines having the other type of polarity. Consequently, the touch signals are protected from interference from the data signals in the data lines, and thus touch detection accuracy is improved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the disclosure to the skilled users in the technology of the disclosure, preferred embodiments will be detailed as follows. The preferred embodiments of the disclosure are illustrated in the accompanying drawings with numbered elements to elaborate the contents and effects to be achieved.

Figure 1:
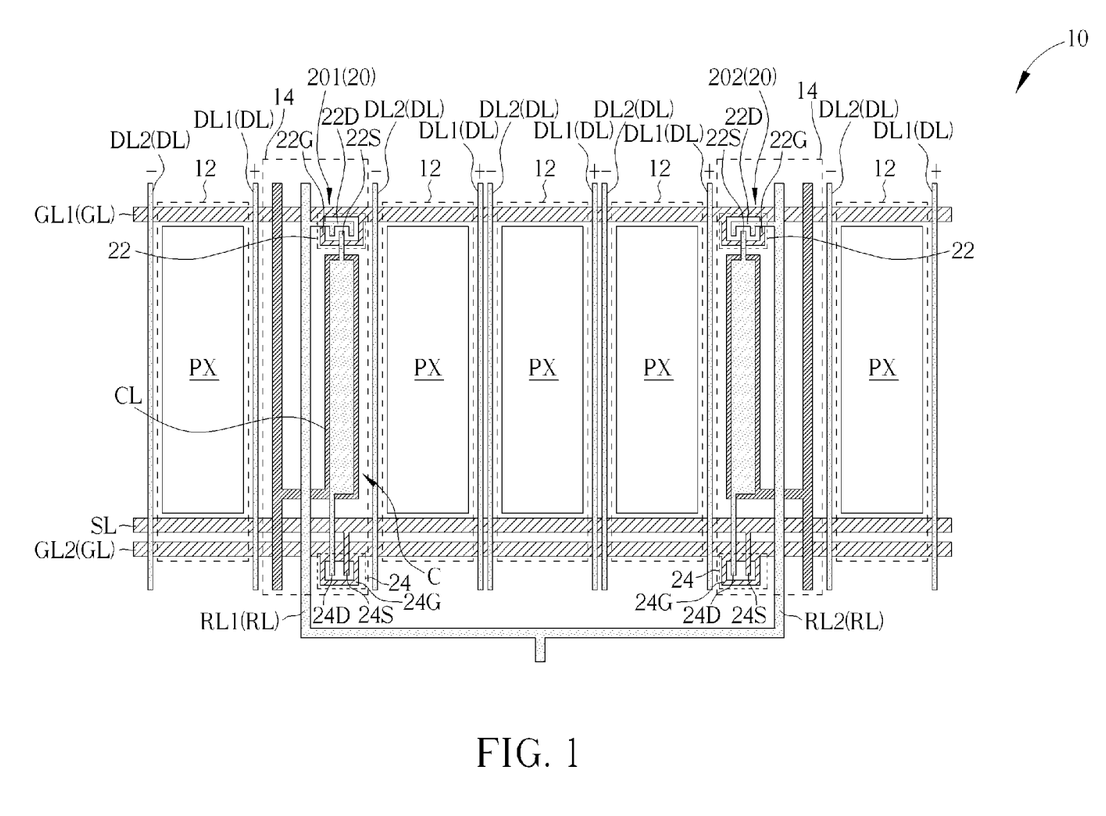
FIG. 1 is a schematic diagram illustrating a photo sensor type touch panel provided by a first embodiment of the disclosure.

Please refer to FIG. 1, which is a schematic diagram illustrating a photo sensor type touch panel provided by a first embodiment of the disclosure. As shown in FIG. 1, the photo sensor type touch panel 10 provided by the instant embodiment includes a plurality of gate lines GL, a plurality of data lines DL, a plurality of readout lines RL, a plurality of photo sensing devices 20, and at least one touch signal line SL. The gate lines GL include a plurality of first gate lines GL1 and a plurality of second gate lines GL2. The first gate lines GL1 and the second gate lines GL2 are substantially extended along a first direction (for example a horizontal direction) and alternately arranged. The data lines are extended along a second direction (for example a vertical direction), and intersect the gate lines GL. The data lines DL include a plurality of first data lines DL1 and a plurality of second data lines DL2. The first data lines DL1 and the second data lines DL2 are alternately arranged. The first data lines DL1 have a first polarity, the second data lines DL2 have a second polarity, and the first polarity and the second polarity are opposite to each other. In this embodiment, the data lines DL are driven by column inversion approach, but not limited to this. For example, the data lines DL in odd columns are taken as the first data lines DL1 and the data lines DL in even columns are taken as the second data lines DL2. The first polarity is positive polarity (depicted by "+" shown in FIG. 1) and the second polarity is negative polarity (depicted by "−" as shown in FIG. 1) in one frame time; however the polarities of the data lines DL are inversed in next one frame time, in other words, the first polarity is negative polarity and the second polarity is positive polarity. The readout lines RL are substantially extended along the second direction and parallel with the data lines DL. The readout lines RL are used to read out touch signals. The readout lines RL include a first readout line RL1 and a second readout line RL2. The first readout line RL1 is disposed in between two adjacent first data line DL1 and second data line DL2, the second readout line RL2 is disposed in between another two adjacent first data line DL1 and second data line DL2, and the first readout line RL1 and the second readout line RL2 are electrically connected in parallel. In this embodiment, a sub-pixel region 12 is disposed in between any two adjacent gate lines GL and a portion of two adjacent data lines DL. A sub-pixel PX is disposed in each of the sub-pixel regions 12. A sensing region 14 is disposed in at least one portion of two adjacent gate lines GL and a portion of two adjacent data lines DL, and the photo sensing devices 20 are disposed in the corresponding sensing regions 14. In addition, no sub-pixel region 12 and sensing region 14 are disposed in portions of two adjacent data lines DL. In this embodiment, the display panel of the photo sensor type touch panel 10 can be a liquid crystal display panel, however the display panel can also be a display panel of other types. The sub-pixels PX exemplarily include red sub-pixel, green sub-pixel, and blue sub-pixel. And each of the sub-pixels PX can include switch devices such as thin film transistor device, pixel electrode, and storage capacitor (not shown). Additionally, a plurality of sub-pixels PX is disposed in any two adjacent photo sensing devices 20. In this embodiment, for example but not limited, three sub-pixels PX are disposed in the two adjacent photo sensing devices 20. The amount and placement of the photo sensing devices 20 do not necessarily correspond to the amount of the sub-pixels PX, it can be adjusted to fit the needs of resolution.

Figure 2:
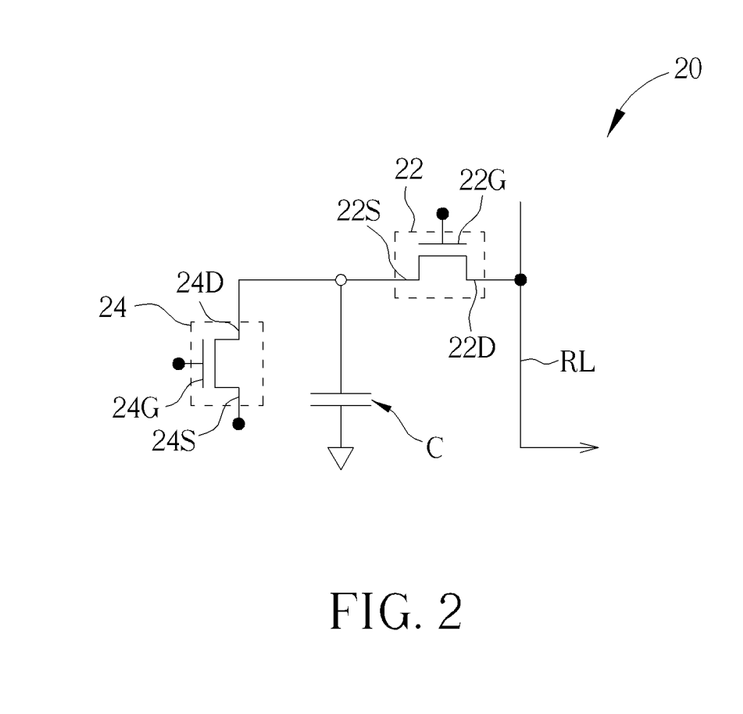
FIG. 2 is an equivalent circuit diagram of the photo sensing device of the present invention.

Please refer to FIG. 2, which is an equivalent circuit diagram of the photo sensing device of the present invention. In order to clearly describe the structure of the present invention, FIG. 1 and FIG. 2 should be referred together. As shown in FIG. 1 and FIG. 2, the photo sensing device 20 includes a readout thin film transistor device 22 and a photo sensing thin film transistor device 24. The readout thin film transistor device 22 includes a gate 22G, a source 22S and a drain 22D. The gate 22G of the readout thin film transistor device 22 is electrically connected to the adjacent first gate line GL1. The photo sensing thin film transistor device 24 includes a gate 24G, a source 24S, and a drain 24D. The gate 24G of the photo sensing thin film transistor device 24 is electrically connected to the adjacent second gate line GL2, the source 24S of the photo sensing thin film transistor device 24 is electrically connected to the touch signal line SL, and the drain 24D of the photo sensing thin film transistor device 24 is electrically connected to the source 22S of the readout thin film transistor device 22 and to form a storage capacitor C with a storage capacitor line CL. The photo sensing device 20 includes at least one first photo sensing device 201 and at least one second photo sensing device 202. The drain 22D of the readout thin film transistor device 22 of the first photo sensing device 201 is electrically connected to the first readout line RL1, and the drain 22D of the readout thin film transistor device 22 of the second photo sensing device 202 is electrically connected to the second readout line RL2.

Figure 3:
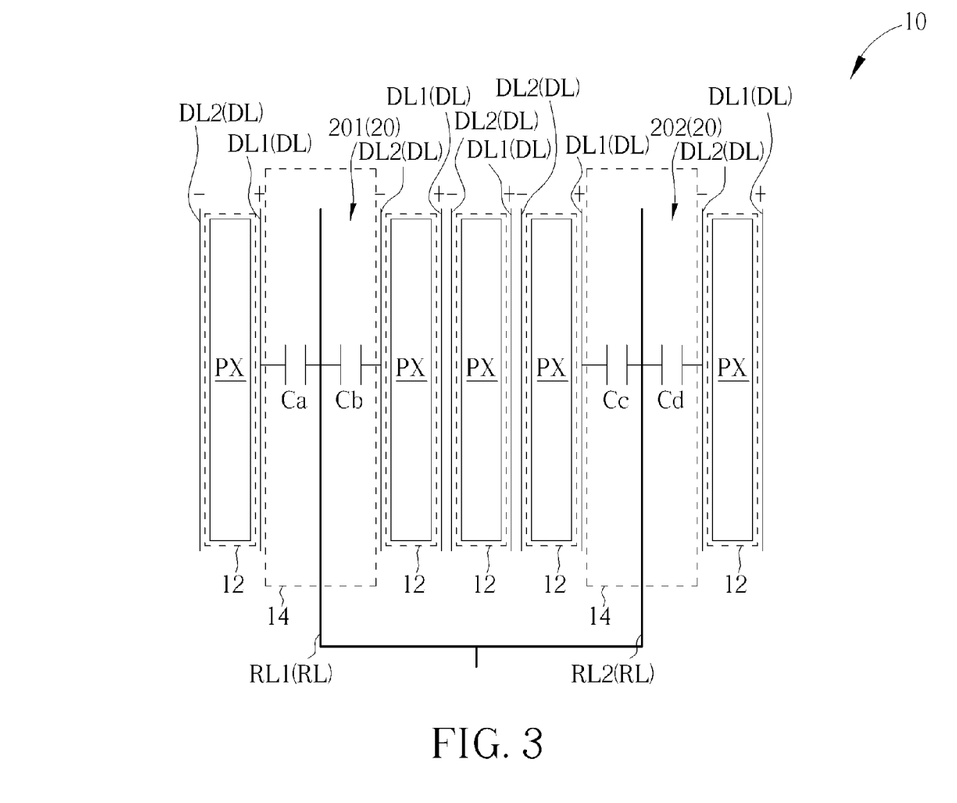
FIG. 3 is a schematic diagram illustrating a coupling capacitor of the photo sensor type touch panel shown in FIG. 1.

Please refer to FIG. 3, which is a schematic diagram illustrating a coupling capacitor of the photo sensor type touch panel shown in FIG. 1. In order to clearly describe the structure of the present invention, FIG. 1 and FIG. 3 should be referred together. As shown in FIG. 1 and FIG. 3, the first readout line RL1 and the first data line DL1 adjacent to the first readout line RL1 have a first coupling capacitor Ca, the first readout line RL1 and the second data line DL2 adjacent to the first readout line RL1 have a second coupling capacitor Cb, the second readout line RL2 and the first data line DL1 adjacent to the second readout line RL2 have a third coupling capacitor Cc, and the second readout line RL2 and the second data line DL2 adjacent to the second readout line RL2 have a fourth coupling capacitor Cd. An overall capacitance of the first coupling capacitor Ca and the third coupling capacitor Cc is substantially equal to an overall capacitance of the second coupling capacitor Cb and the fourth coupling capacitor Cd. Since the first readout line RL1 and the second readout line RL2 are electrically connected in parallel, and the coupling capacitors of the first readout line RL1 and its adjacent data lines DL and of the second readout line RL2 and its adjacent data lines DL have the abovementioned relationship, the touch signal in the readout line RL is not impacted by the polarity inversion when the data lines DL are in inversion driving, and thus touch detection accuracy is protected from the those influence. Specifically speaking, in this embodiment, since the overall capacitance of the first coupling capacitor Ca and the third coupling capacitor Cc are substantially equal to the overall capacitance of the second coupling capacitor Cb and the fourth coupling capacitor Cd, the coupling capacitors between the first readout line RL1 and its adjacent first data line DL1 and between the second readout line RL2 and its adjacent first data lines DL1 (the first coupling capacitor Ca and the third coupling capacitor Cc) are substantially equal to the coupling capacitors between the first readout line RL1 and its adjacent second data line DL2 and between the second readout line RL2 and its adjacent second data line DL2 (the second coupling capacitor Cb and the fourth coupling capacitor Cd) at any frame time, even though the polarities of the data signals are inverted by the column inversion approach. Because the coupling capacitors are equal to each other, the touch signals transmitted by the readout lines RL will not be impacted during inverting data signals of the data lines DL. Consequently, the input track no longer suffers broken line issue during touch inputting.

In this embodiment, the first readout line RL1 is disposed on a right side of its adjacent first data line DL1 and on a left side of its adjacent second data line DL2, and the second readout line RL2 is disposed on a right side of its adjacent first data line DL1 and on a left side of its adjacent second data line DL2. The first coupling capacitor Ca between the first readout line RL1 and the first data line DL1 may not be equal to the third coupling capacitor Cc between the second readout line RL2 and the first data line DL1, and the second coupling capacitor Cb between the first readout line RL1 and the second data line DL2 may not be equal to the fourth coupling capacitor Cd between the second readout line RL2 and the second data line DL2. For example, in the case that the first readout line RL1 is closer to the first data line DL1 and the second readout line RL2 is closer to the second data line DL2, the first coupling capacitor Ca is larger than the third coupling capacitor Cc while the second coupling capacitor Cb is smaller than the fourth coupling capacitor Cd. In this embodiment, since the first photo sensing device 201 and the second photo sensing device 202 have a mirror symmetry layout, the overall capacitance of the first coupling capacitor Ca and the third coupling capacitor Cc is substantially equal to the overall capacitance of the second coupling capacitor Cb and the fourth coupling capacitor Cd. It should be noted that the first photo sensing device 201 and the second photo sensing device 202 are not limited to be embodied in mirror symmetry. For example, by adjusting the relative placement or size of the first photo sensing device 201 and the second photo sensing device 202, or by adjusting the shape or size of the electrode of the storage capacitor C, the coupling capacitor can be accordingly adjusted, and consequently the overall capacitance of the first coupling capacitor Ca and the third coupling capacitor Cc is substantially equal to the overall capacitance of the second coupling capacitor Cb and the fourth coupling capacitor Cd.

The photo sensor type touch panel is not limited to above mentioned embodiment. Accordingly, the disclosure further provides photo sensor type touch panels according to other different embodiments or modifications. To simplify the description, the identical components in each of the following are designated by the same numerals. For making it easier to compare the difference between the preferred embodiments, the following description will detail the dissimilarities among different embodiments and the identical features will not be redundantly described.

Figure 4:
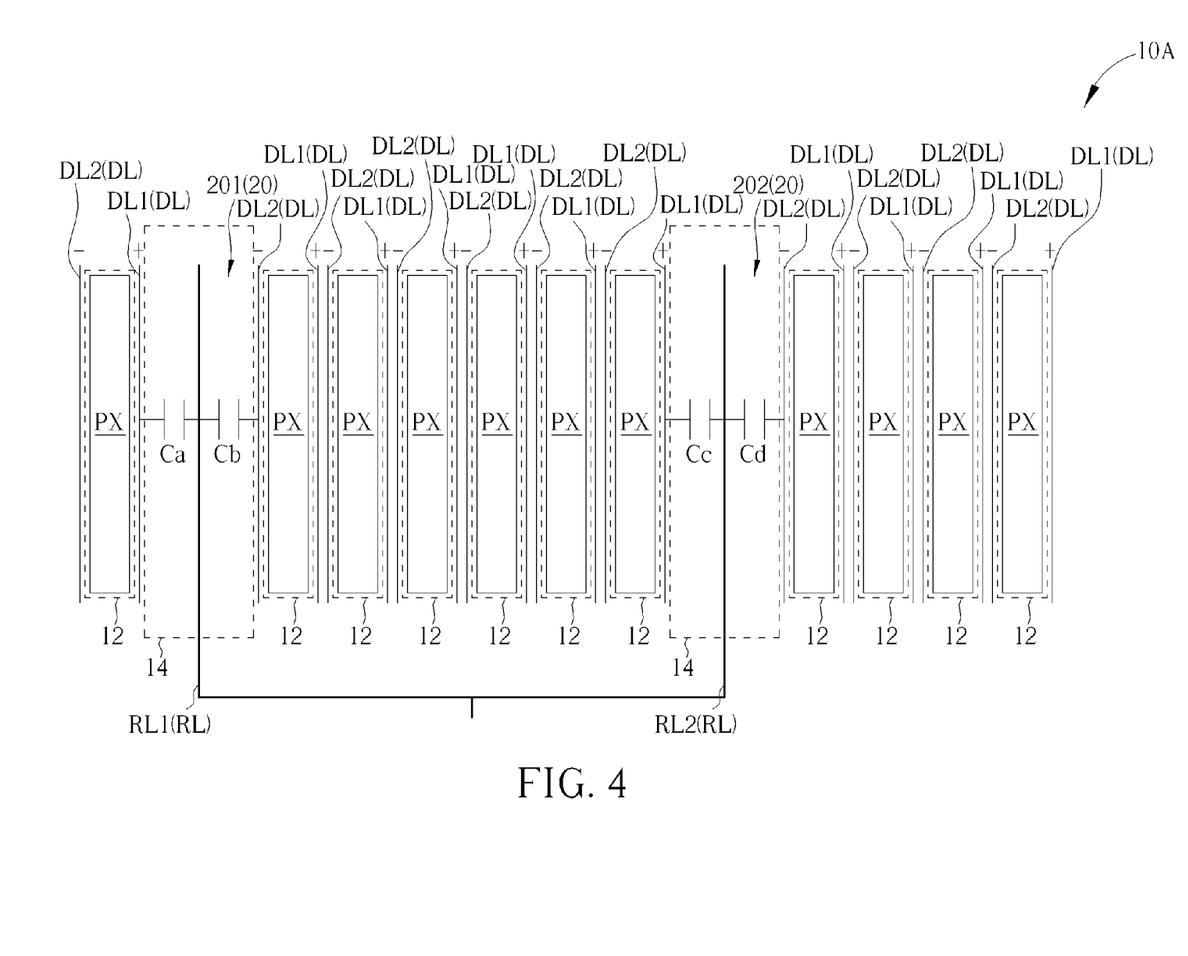
FIG. 4 is a schematic diagram illustrating a coupling capacitor of a photo sensor type touch panel provided by a first modification of the disclosure.

Please refer to FIG. 4, which is a schematic diagram illustrating a coupling capacitor of a photo sensor type touch panel provided by a first modification of the disclosure. As shown in FIG. 4, the photo sensor type touch panel 10A provided by the instant modification, which is different from the afore mentioned embodiment, includes six sub-pixels PX between the adjacent first photo sensing device 201 and the second photo sensing device 202.

Figure 5:
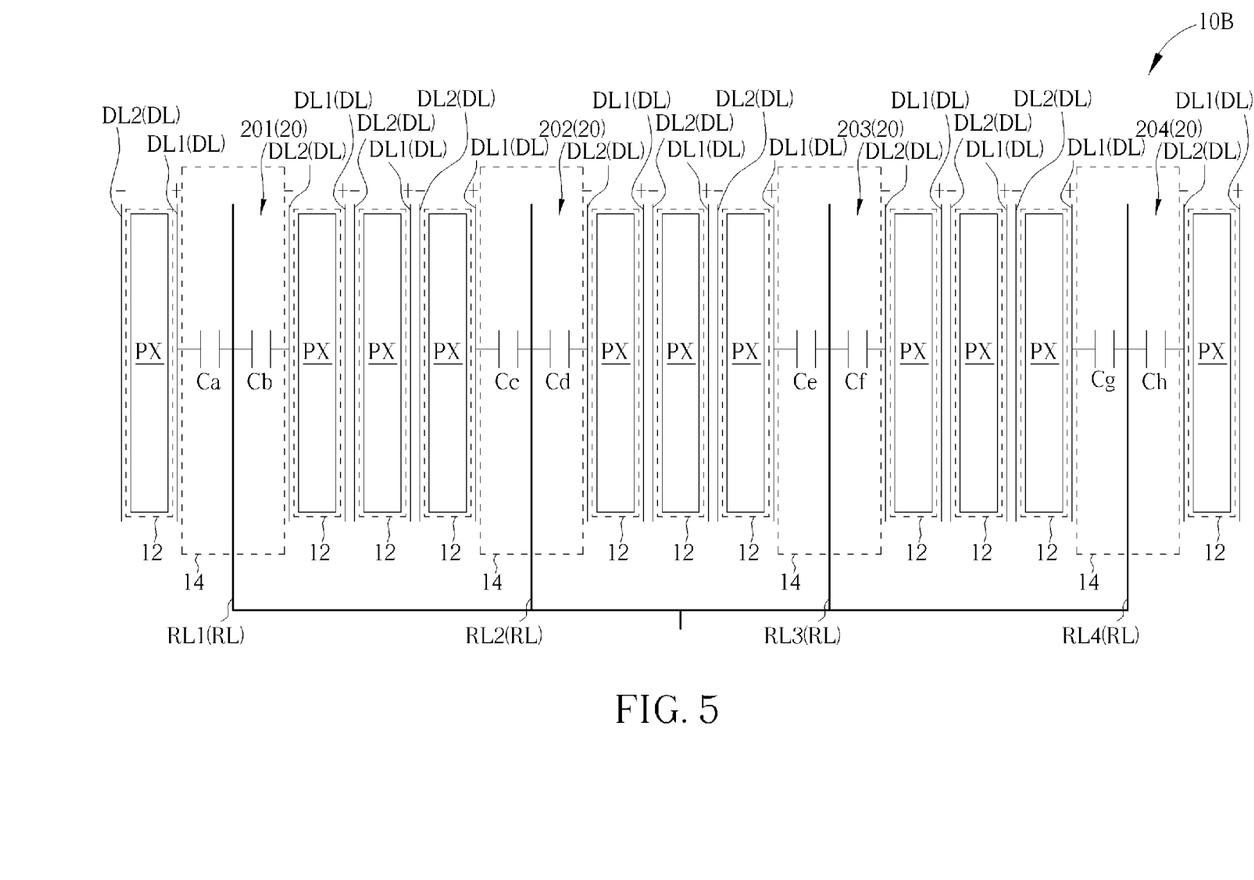
FIG. 5 is a schematic diagram illustrating a coupling capacitor of a photo sensor type touch panel provided by a second modification of the disclosure.

Please refer to FIG. 5, which is a schematic diagram illustrating a coupling capacitor of a photo sensor type touch panel provided by a second modification of the disclosure. As shown in FIG. 5, the readout line RL of the photo sensor type touch panel 10B provided by the instant modification further includes a third readout line RL3 disposed in between another adjacent first data line DL1 and second data line DL2, and a fourth readout line RL4 disposed in between another adjacent first data line DL1 and second data line DL2. The third readout line RL3 and the fourth readout line RL4 are electrically connected in parallel. Additionally, the third readout line RL3 and the fourth readout line RL4 are electrically connected to the first readout line RL1 and the second readout line RL2. In other words, the first readout line RL1, the second readout line RL2, the third readout line RL3, and the fourth readout line RL4 are all electrically connected in parallel. The photo sensing device 20 further includes at least one third photo sensing device 203 and at least one fourth photo sensing device 204. The drain 22D of the readout thin film transistor device 22 of the third photo sensing device 203 is electrically connected to the third readout line RL3, and the drain 22D of the readout thin film transistor device 22 of the fourth photo sensing device 204 is electrically connected to the fourth readout line RL4. The third readout line RL3 and the first data line DL1 adjacent to the third readout line RL3 have a fifth coupling capacitor Ce, the third readout line RL3 and the second data line DL2 adjacent to the third readout line RL3 have a sixth coupling capacitor Cf, the fourth readout line RL4 and the first data line DL1 adjacent to the fourth readout line RL4 have a seventh coupling capacitor Cg, and the fourth readout line RL4 and the second data line DL2 adjacent to the fourth readout line RL4 have an eighth coupling capacitor Ch. An overall capacitance of the first coupling capacitor Ca, the third coupling capacitor Cc, the fifth coupling capacitor Ce, and the seventh coupling capacitor Cg is substantially equal to an overall capacitance of the second coupling capacitor Cb, the fourth coupling capacitor Cd, the sixth coupling capacitor Cf, and the eighth coupling capacitor Ch.

Figure 6:
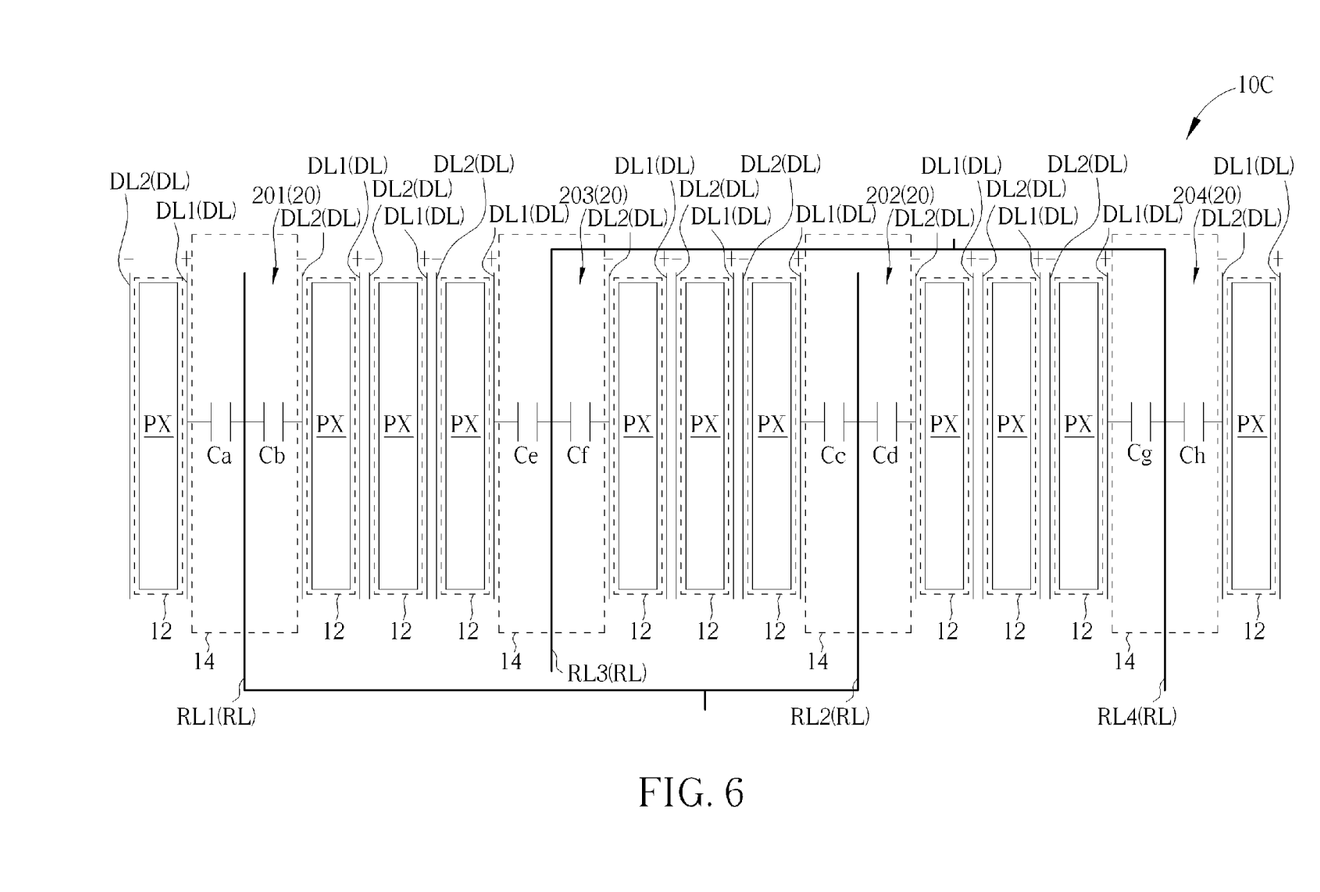
FIG. 6 is a schematic diagram illustrating a coupling capacitor of a photo sensor type touch panel provided by a third modification of the disclosure.

Please refer to FIG. 6, which is a schematic diagram illustrating a coupling capacitor of a photo sensor type touch panel provided by a third modification of the disclosure. As shown in FIG. 6, the readout line RL of the photo sensor type touch panel 10C provided by the instant modification further includes a third readout line RL3 disposed in between another adjacent first data line DL1 and second data line DL2, and a fourth readout line RL4 disposed in between another adjacent first data line DL1 and second data line DL2. The third readout line RL3 and the fourth readout line RL4 are electrically connected in parallel. Different from the first and second modifications, the third readout line RL3 and the fourth readout line RL4 of the instant modification is electrically isolated from the first readout line RL1 and the second readout line RL2, and the third readout line RL3 and the fourth readout line RL4 are preferably arranged alternately with the first readout line RL1 and the second readout line RL2. An overall capacitance of the first coupling capacitor Ca and the third coupling capacitor Cc is substantially equal to an overall capacitance of the second coupling capacitor Cb and the fourth coupling capacitor Cd, and an overall capacitance of the fifth coupling capacitor Ce and the seventh coupling capacitor Cg is substantially equal to an overall capacitance of the sixth coupling capacitor Cf and the eighth coupling capacitor Ch.

Figure 7:
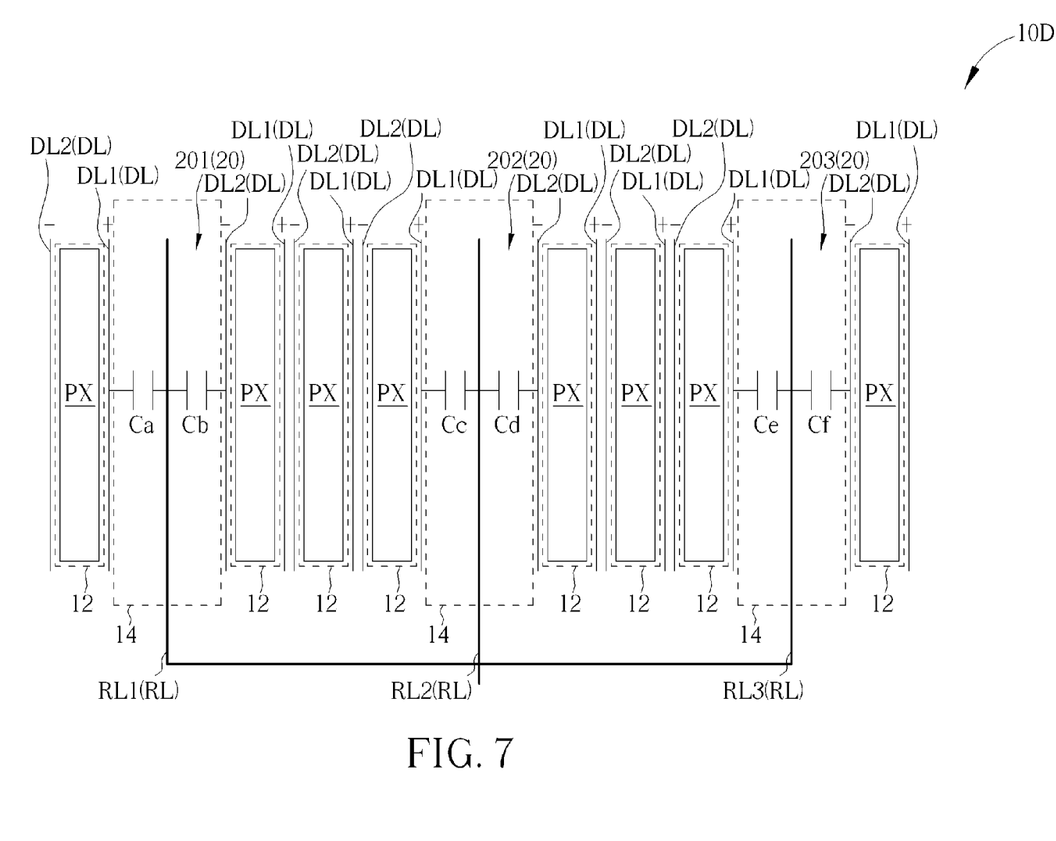
FIG. 7 is a schematic diagram illustrating a coupling capacitor of a photo sensor type touch panel provided by a fourth modification of the disclosure.

Please refer to FIG. 7, which is a schematic diagram illustrating a coupling capacitor of a photo sensor type touch panel provided by a fourth modification of the disclosure. As shown in FIG. 7, the readout line RL of the photo sensor type touch panel 10D provided by the instant modification further includes a third readout line RL3 disposed in between another adjacent first data line DL1 and second data line DL2. The first readout line RL1, the second readout line RL2, and the third readout line RL3 are electrically connected in parallel. The photo sensing device 20 further includes at least one third photo sensing device 203, and the drain 22D of the readout thin film transistor device 22 of the third the photo sensing device 203 is electrically connected to the third readout line RL3. The third readout line RL3 and the first data line DL1 adjacent to the third readout line RL3 have a fifth coupling capacitor Ce, and the third readout line RL3 and the second data line DL2 adjacent to the third readout line RL3 have a sixth coupling capacitor Cf. An overall capacitance of the first coupling capacitor Ca, the third coupling capacitor Cc, and the fifth coupling capacitor Ce is substantially equal to an overall capacitance of the second coupling capacitor Cb, the fourth coupling capacitor Cd, and the sixth coupling capacitor Cf.

Figure 8:
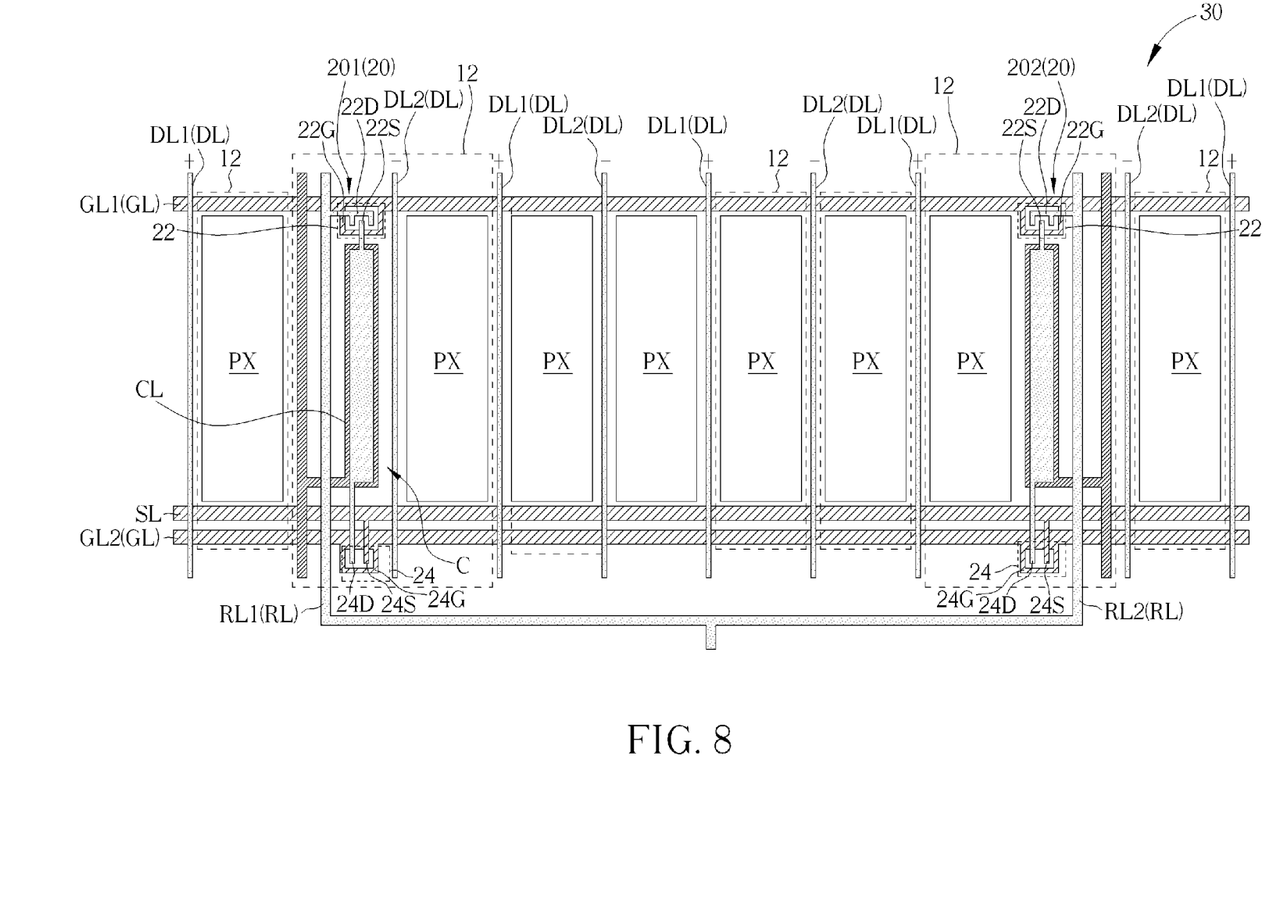
FIG. 8 is a schematic diagram illustrating a photo sensor type touch panel provided by a second embodiment of the disclosure.
Figure 9:
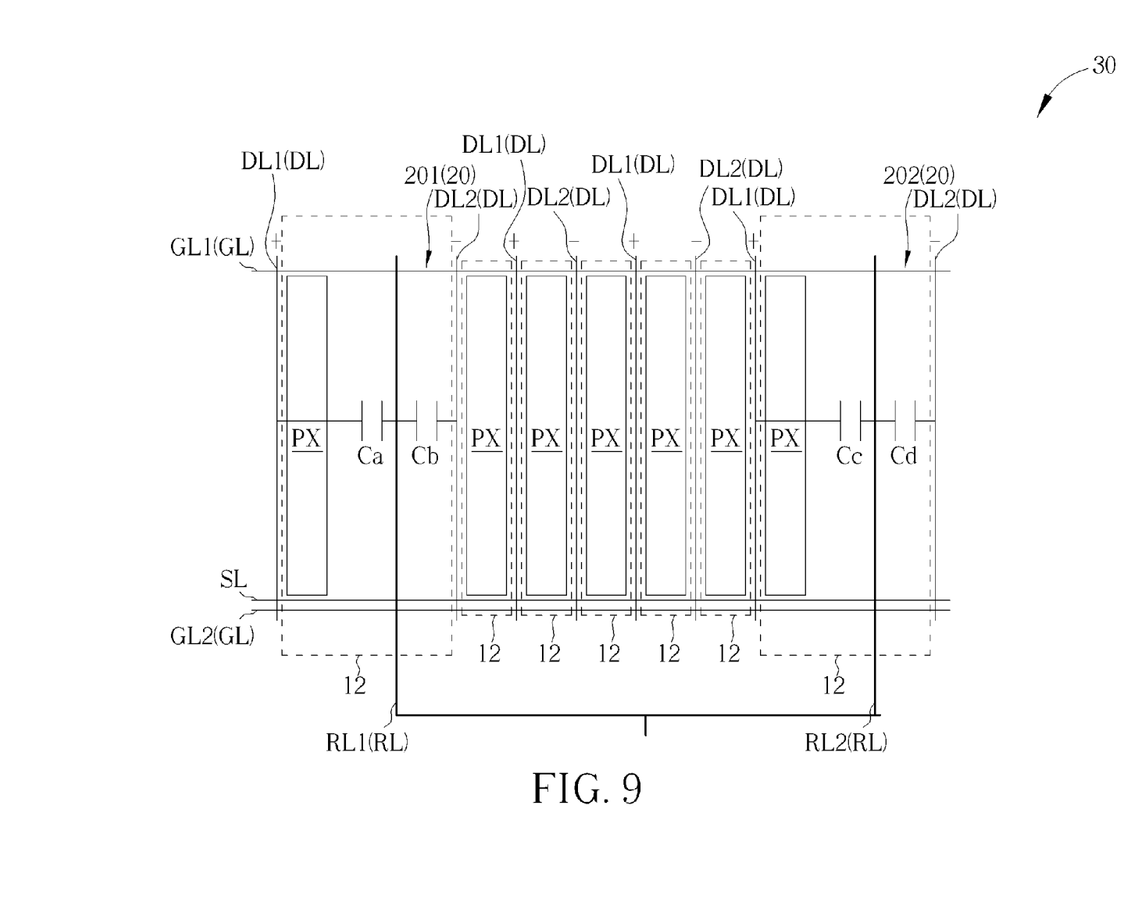
FIG. 9 is a schematic diagram illustrating a coupling capacitor of the photo sensor type touch panel shown in FIG. 8.

Please refer to FIG. 8 and FIG. 9, wherein FIG. 8 is a schematic diagram illustrating a photo sensor type touch panel provided by a second embodiment of the disclosure and FIG. 9 is a schematic diagram illustrating a coupling capacitor of the photo sensor type touch panel shown in FIG. 8. As shown in FIG. 8 and FIG. 9, the difference between the first embodiment and the instant embodiment is the different arrangements for the data lines: In the photo sensor type touch panel 30 of this embodiment, a sub-pixel region 12 is disposed in between any two adjacent gate lines GL and any two adjacent data lines DL, each of the sub-pixel regions 12 includes a sub-pixel PX formed therein, and a portion of the sub-pixel regions 12 further includes the photo sensing devices 20 formed therein. Additionally, the similarity between the instant embodiment and the first embodiment is: the first data lines DL1 and the second data lines DL2 are alternately disposed, a data signal of the first data lines DL1 have a first polarity, a data signal of the second data lines DL2 have a second polarity, and the first polarity and the second polarity are opposite to each other. In other words, the data lines DL are driven in inversion approach, but not limited to this. Furthermore, the first readout line RL1 and the second readout line RL2 are electrically connected in parallel. The first readout line RL1 is disposed on a right side of its adjacent first data line DL1 and on a left side of its adjacent second data line DL2, and the second readout line RL2 is disposed on a right side of its adjacent first data line DL1 and on a left side of its adjacent second data line DL2. The first readout line RL1 and the first data line DL1 adjacent to the first readout line RL1 have a first coupling capacitor Ca, the first readout line RL1 and the second data line DL2 adjacent to the first readout line RL1 have a second coupling capacitor Cb, the second readout line RL2 and the first data line DL1 adjacent to the second readout line RL2 have a third coupling capacitor Cc, and the second readout line RL2 and the second data line DL2 adjacent to the second readout line RL2 have a fourth coupling capacitor Cd. An overall capacitance of the first coupling capacitor Ca and the third coupling capacitor Cc is substantially equal to an overall capacitance of the second coupling capacitor Cb and the fourth coupling capacitor Cd. Furthermore, the first photo sensing device 201 and the second photo sensing device 202 can have a mirror symmetry layout. Therefore the overall capacitance of the first coupling capacitor Ca and the third coupling capacitor Cc is substantially equal to the overall capacitance of the second coupling capacitor Cb and the fourth coupling capacitor Cd. However, the first photo sensing device 201 and the second photo sensing device 202 are not limited to be embodied in mirror symmetry. For example, by adjusting the relative placement or size of the first photo sensing device 201 and the second photo sensing device 202, or by adjusting the shape or size of the electrode of the storage capacitor C, the overall capacitance of the first coupling capacitor Ca and the third coupling capacitor Cc is substantially equal to the overall capacitance of the second coupling capacitor Cb and the fourth coupling capacitor Cd. The photo sensor type touch panel 30 also includes the modifications as illustrated in FIGS. 4-7, and those details are omitted in the interest of brevity.

Figure 10:
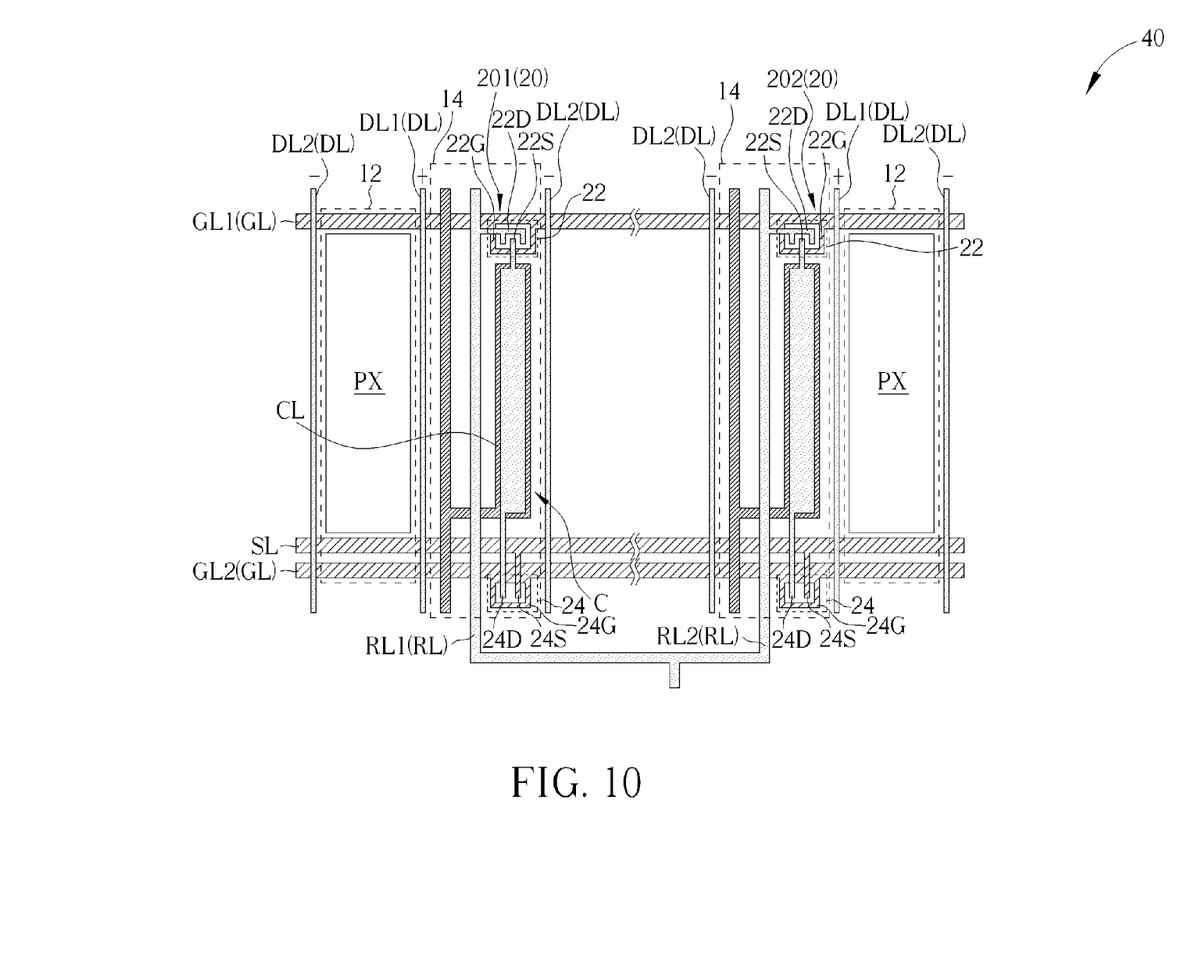
FIG. 10 is a schematic diagram illustrating a photo sensor type touch panel provided by a third embodiment of the disclosure.
Figure 11:
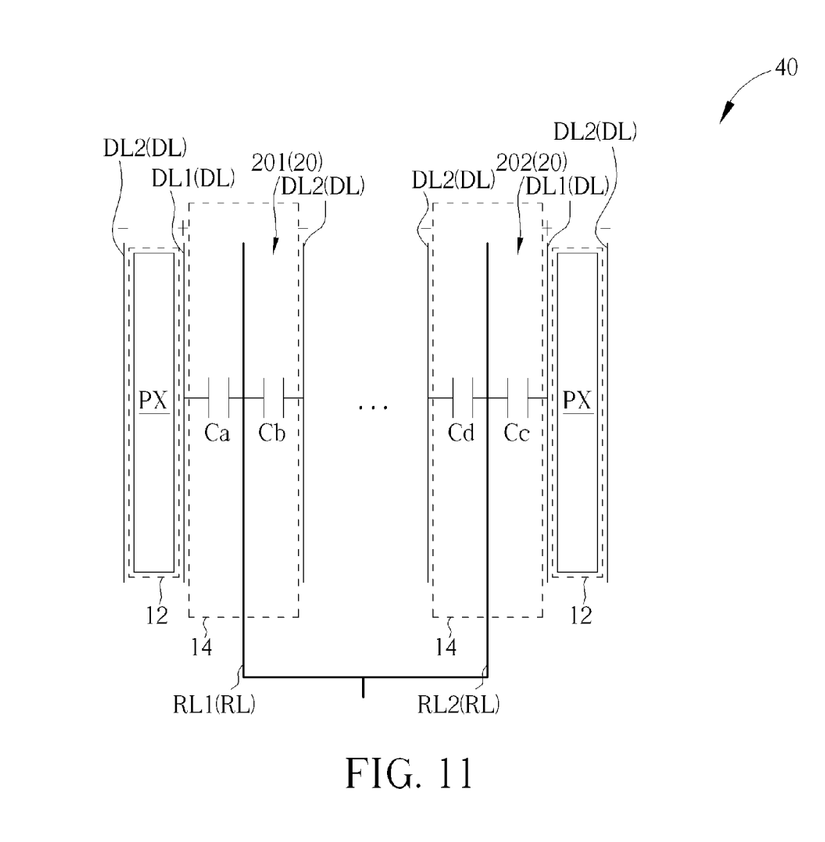
FIG. 11 is a schematic diagram illustrating a coupling capacitor of the photo sensor type touch panel shown in FIG. 10.

Please refer to FIG. 10 and FIG. 11, wherein FIG. 10 is a schematic diagram illustrating a photo sensor type touch panel provided by a third embodiment of the disclosure and FIG. 11 is a schematic diagram illustrating a coupling capacitor of the photo sensor type touch panel shown in FIG. 10. As shown in FIG. 10 and FIG. 11, the first readout line RL1 and the second readout line RL2 of the photo sensor type touch panel 40 provided by the instant embodiment are electrically connected in parallel. The first readout line RL1 is disposed on a right side of its adjacent first data line DL1 and on a left side of its adjacent second data line DL2, and the second readout line RL2 is disposed on a right side of its adjacent second data line DL2 and on a left side of its adjacent first data line DL1. The first readout line RL1 and the first data line DL1 adjacent to the first readout line RL1 have a first coupling capacitor Ca, the first readout line RL1 and the second data line DL2 adjacent to the first readout line RL1 have a second coupling capacitor Cb, the second readout line RL2 and the first data line DL1 adjacent to the second readout line RL2 have a third coupling capacitor Cc, the second readout line RL2 and the second data line DL2 adjacent to the second readout line RL2 have a fourth coupling capacitor Cd. Therefore an overall capacitance of the first coupling capacitor Ca and the third coupling capacitor Cc is substantially equal to an overall capacitance of the second coupling capacitor Cb and the fourth coupling capacitor Cd. The first photo sensing device 201 and the second photo sensing device 202 can have identical layout, but not limited to this. For example, by adjusting the relative placement or size of the first photo sensing device 201 and the second photo sensing device 202, or by adjusting the shape or size of the electrode of the storage capacitor C, the overall capacitance of the first coupling capacitor Ca and the third coupling capacitor Cc is equal to the overall capacitance of the second coupling capacitor Cb and the fourth coupling capacitor Cd. The amounts and connection relationship between the readout lines RL of the photo sensor type touch panel 40 of the instant embodiment, or the relative placement of the sub-pixels PX can be modified as shown in FIGS. 4-7, and those details are omitted for simplicity.

Figure 12:
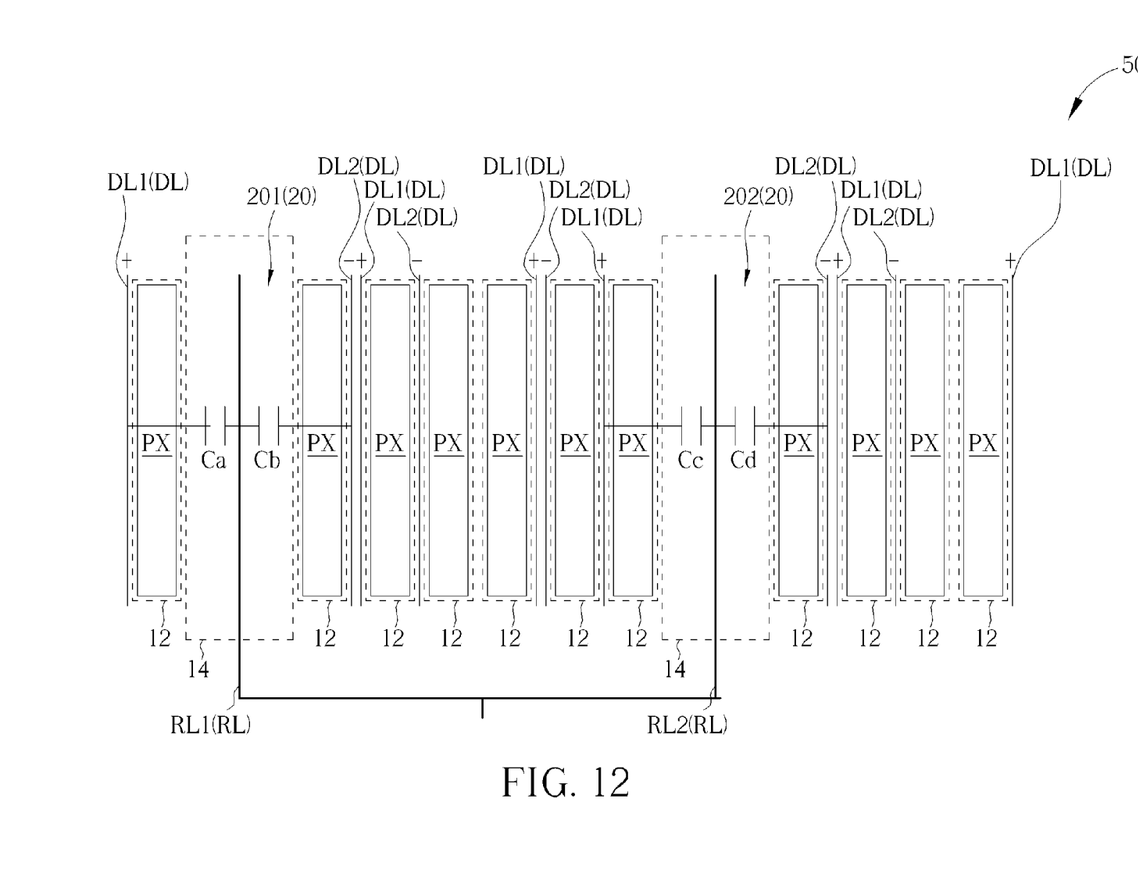
FIG. 12 is a schematic diagram illustrating a photo sensor type touch panel provided by a fourth embodiment of the disclosure.

Please refer to FIG. 12, which is a schematic diagram illustrating a photo sensor type touch panel provided by a fourth embodiment of the disclosure. As shown in FIG. 12, the difference between the instant embodiment and the first and second embodiments is the different arrangements for the data lines. In the photo sensor type touch panel 50 of the instant embodiment, a portion of two adjacent sub-pixel regions 12 includes two data lines DL formed therein, a portion of two adjacent sub-pixel regions 12 include one data line DL formed therein, and a portion of two adjacent sub-pixel regions 12 include no data lines formed therein. Additionally, the first photo sensing device 201 is disposed in between two adjacent sub-pixels PX and the second photo sensing device 202 is disposed in between two adjacent sub-pixels PX. The first readout line RL1 and the second readout line RL2 are electrically connected in parallel. An overall capacitance of the first coupling capacitor Ca and the third coupling capacitor Cc is substantially equal to an overall capacitance of the second coupling capacitor Cb and the fourth coupling capacitor Cd. The amounts and connection relationship between the readout lines RL of the photo sensor type touch panel 50 of the instant embodiment, or the relative placement of the sub-pixels PX can be modified as shown in FIGS. 4-7, and those details are omitted for simplicity.

In conclusion, the photo sensor type touch panel provided by the present disclosure includes the plurality of readout lines electrically connected in parallel, and the overall capacitance of the coupling capacitor between the readout lines and adjacent data lines having one type of polarity is substantially equal to the overall capacitance of the coupling capacitor between the readout lines and adjacent data lines having the other type of polarity. Consequently, the touch signals are protected from influences from the data signals in the data lines, and thus touch detection accuracy is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A photo sensor type touch panel comprising:
    a plurality of gate lines comprising a plurality of first gate lines and a plurality of second gate lines, wherein the first gate lines and the second gate lines are alternately arranged;
    a plurality of data lines intersecting the gate lines, wherein the data lines comprise a plurality of first data lines and a plurality of second data lines, data signals of the first data lines have a first polarity, data signals of the second data lines have a second polarity, and the first polarity and the second polarity are opposite to each other;
    a plurality of readout lines, comprising:
        a first readout line disposed in between two adjacent first data line and second data line; and
        a second readout line disposed in between another two adjacent first data line and second data line, wherein the first readout line and the second readout line are electrically connected in parallel;
    at least one touch signal line; and
    a plurality of photo sensing devices, each of the photo sensing devices comprising:
        a storage capacitor;
        a readout thin film transistor device comprising a gate, a source and a drain, wherein the gate of the readout thin film transistor device is electrically connected to the adjacent first gate line; and
        a photo sensing thin film transistor device comprising a gate, a source and a drain, wherein the gate of the photo sensing thin film transistor device is electrically connected to the adjacent second gate line, the source of the photo sensing thin film transistor device is electrically connected to the touch signal line, and the drain of the photo sensing thin film transistor device is electrically connected to the source of the readout thin film transistor device,
    wherein the plurality of photo sensing devices comprise at least one first photo sensing device and at least one second photo sensing device, the drain of the readout thin film transistor device of the first photo sensing device is electrically connected to the first readout line, and the drain of the readout thin film transistor device of the second photo sensing device is electrically connected to the second readout line; and
    wherein the first readout line and the first data line adjacent to the first readout line have a first coupling capacitor, the first readout line and the second data line adjacent to the first readout line have a second coupling capacitor, the second readout line and the first data line adjacent to the second readout line have a third coupling capacitor, the second readout line and the second data line adjacent to the second readout line have a fourth coupling capacitor, an overall capacitance of the first coupling capacitor and the third coupling capacitor is substantially equal to an overall capacitance of the second coupling capacitor and the fourth coupling capacitor.

2. The photo sensor type touch panel of claim 1, wherein the first readout line is disposed on a right side of the adjacent first data line and on a left side of the adjacent second data line, and the second readout line is disposed on a right side of the adjacent first data line and on a left side of the adjacent second data line.

3. The photo sensor type touch panel of claim 2, wherein the first photo sensing device and the second photo sensing device have a mirror symmetry layout.

4. The photo sensor type touch panel of claim 1, wherein the first readout line is disposed on a right side of the adjacent first data line and on a left side of the adjacent second data line, and the second readout line is disposed on a right side of the adjacent second data line and on a left side of the adjacent first data line.

5. The photo sensor type touch panel of claim 4, wherein the first photo sensing device and the second photo sensing device have an identical layout.

6. The photo sensor type touch panel of claim 1, wherein a sub-pixel region is defined by any two adjacent gate lines and a portion of two adjacent data lines, sub-pixels are respectively disposed in each sub-pixel region, a sensing region is defined by a portion of two adjacent gate lines and a portion of two adjacent data lines, and the photo sensing devices are disposed in the sensing regions correspondingly.

7. The photo sensor type touch panel of claim 1, wherein a sub-pixel region is defined by any two adjacent gate lines and any two adjacent data lines, a sub-pixels are respectively disposed in each sub-pixel region, and the photo sensing devices are further disposed in a portion of the sub-pixel regions.

8. The photo sensor type touch panel of claim 1, wherein a plurality of sub-pixels are disposed between any two adjacent photo sensing devices.

9. The photo sensor type touch panel of claim 1, wherein the readout lines further comprise:
    a third readout line disposed between another adjacent two first data line and the second data line; and
    a fourth readout line disposed between still another adjacent two first data line and the second data line, wherein the third readout lint and the fourth readout line are electrically connected in parallel,
    wherein the third readout line and the first data line adjacent to the third readout line have a fifth coupling capacitor, the third readout line and the second data line adjacent to the third readout line have a sixth coupling capacitor, the fourth readout line and the first data line adjacent to the fourth readout line have a seventh coupling capacitor, and the fourth readout line and the second data line adjacent to the fourth readout line have an eighth coupling capacitor.

10. The photo sensor type touch panel of claim 9, wherein the third readout line and the fourth readout line are electrically isolated from the first readout line and the second readout line, and an overall capacitance of the fifth coupling capacitor and the seventh coupling capacitor is substantially equal to an overall capacitance of the sixth coupling capacitor and the eighth coupling capacitor.

11. The photo sensor type touch panel of claim 9, wherein the third readout line and the fourth readout line are electrically connected to the first readout line and the second readout line, and an overall capacitance of the first coupling capacitor, the third coupling capacitor, the fifth coupling capacitor, and the seventh coupling capacitor is substantially equal to an overall capacitance of the second coupling capacitor, the fourth coupling capacitor, the sixth coupling capacitor, and the eighth coupling capacitor.

12. The photo sensor type touch panel of claim 9,
wherein the plurality of photo sensing devices further comprise at least one third photo sensing device and at least one fourth photo sensing device, the drain of the readout thin film transistor device of the third photo sensing device is electrically connected to the third readout line, and the drain of the readout thin film transistor device of the fourth photo sensing device is electrically connected to the fourth readout line.

13. The photo sensor type touch panel of claim 1, wherein the readout lines further comprise a third readout line disposed between another two adjacent first data line and second data line, wherein the first readout line, the second readout line, and the third readout line are electrically connected in parallel, the third readout line and the first data line adjacent to the third readout line have a fifth coupling capacitor, the third readout line and the second data line adjacent to the third readout line have a sixth coupling capacitor, and an overall capacitance of the first coupling capacitor, the third coupling capacitor, and the fifth coupling capacitor is substantially equal to an overall capacitance of the second coupling capacitor, the fourth coupling capacitor, and the sixth coupling capacitor.

14. The photo sensor type touch panel of claim 1, wherein the first data lines and the second data lines are alternately arranged.

* * * * *